Feb. 25, 1941.  W. C. TRYTHALL  2,233,300
SUPPORT FOR LAMPS AND THE LIKE
Filed July 27, 1939
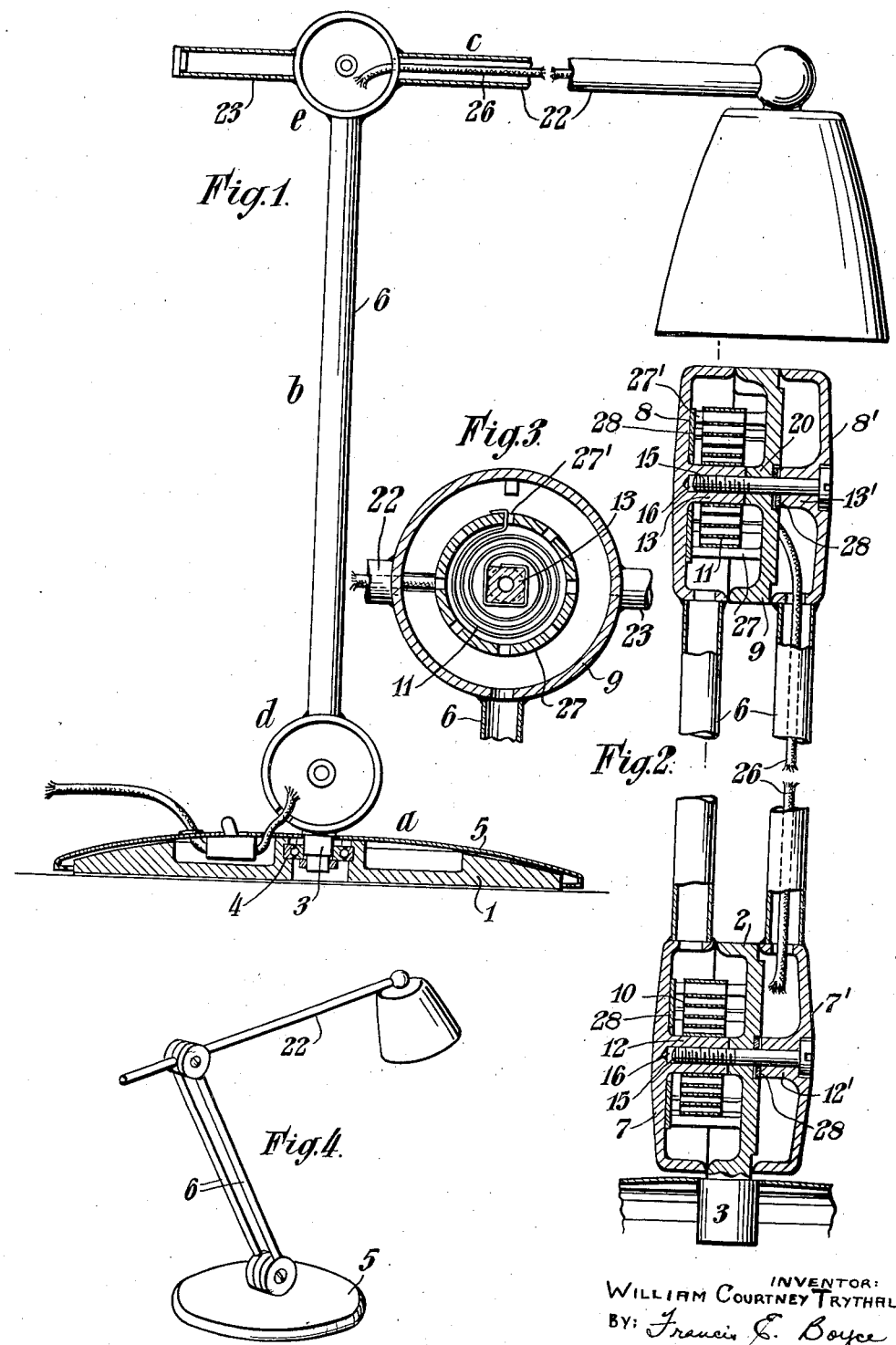
INVENTOR:
WILLIAM COURTNEY TRYTHALL
BY: Francis E. Boyce
ATTORNEY Patented Feb. 25, 1941

2,233,300

UNITED STATES PATENT OFFICE 2,233,300

SUPPORT FOR LAMPS AND THE LIKE

William Courtney Trythall, Colchester, England, assignor to E. N. Mason & Sons Limited, Colchester, England Application July 27, 1939, Serial No. 286,747
In Great Britain July 28, 1938

6 Claims. (Cl. 248—123)

This invention relates to supports for lamps and like articles and it has for its object an improved balanced support without counterweight applicable for use as a deskstand, a ceiling suspension, a wall bracket and like uses, enabling a comparatively light article such as an electric lamp, a light drill, a mirror or other article the position of which requires frequent adjustment, to be conveniently and easily placed exactly in any desired position.

In order to explain the principle of my invention, I will describe its application to a deskstand for an electric lamp, it being understood that this is only one of numerous other applications to which my invention may be put.

According to my invention, I provide a support for a comparatively light article, without counterweight, of the kind comprising a plurality of members pivotally joined by means of joints comprising members capable of relative rotation and one or more resilient members adapted to exert a tangential force in either of two opposite directions, tending to bring the jointed parts back in a certain position, hereafter referred to as the "rest position" whenever they are given an angular relative displacement in either direction, thereby counter-acting the tendency of the weight of the supported article to increase this angular relative displacement, and an adjustable axial pressure member or members, adapted to regulate the frictional resistance to relative angular motion of the jointed parts.

In the preferred manner of carrying out my invention, this tangential force is provided by one or more spiral springs of such thickness as to exert approximately the same resistance to both the winding and the unwinding of the said spring by the relative angular motion of the jointed parts.

In the preferred construction of the joint, I provide at least two parts relatively movable angularly, said parts being provided with bearing surfaces adapted to be adjustably pressed against each other, e. g. by means of an axial threaded member on one, engaging a correspondingly threaded member on the other, to provide a friction resistance to their relative angular motion, the said two parts being so shaped as to constitute a casing for the spiral spring or springs providing the tangential force, as described above, said spring or springs being secured at the centre to one of the relatively angularly movable parts, and at their outer end to one of the other parts adapted to move angularly with respect to the first, the whole mechanism being enclosed in the casing so constituted.

Referring to the accompanying drawing:

Fig. 1 is a central sectional elevation of a support comprising two jointed arms;

Fig. 2 is a part sectional elevation to an enlarged scale of the support shown in Fig. 1, the section being at right angles to that shown in Fig. 1;

Fig. 3 is an internal view of one of the parts constituting a joint;

Fig. 4 is a perspective view.

In the figures, $a$ is the base of the support, which consists of two tubular arms $b$ and $c$ connected by swivel heads $d$ and $e$.

The base $a$ comprises a massive member 1, of iron, lead or other heavy suitable material, on which is pivotally mounted a disc member 2 by means of a pivot 3 in a ball bearing 4. To the pivot 3 is secured a circular plate 5, adapted to rotate together with the disc 2 and so shaped as to constitute a cover for the base member 1.

The disc member 2 constitutes the middle member of the lower swivel head $d$, and, on it, is pivotally mounted the arm $b$ of the support, consisting of two tubular members 6, secured at each end, e. g. by welding, to disc members 7, 7' and 8, 8', adapted to be pivotally mounted on either side, respectively, of the discs members 2 and 9, which are exactly similar, constituting the central members of the swivel heads $d$ and $e$, respectively.

The disc members 7, 7' and 8, 8' are each provided with central boss 12, 12' and 13, 13', respectively, the bosses 12 and 13 being square, and one disc member of each pair, namely the disc members 7 and 8, is recessed to provide a housing for a spiral spring, 10 and 11, respectively, the other disc member being recessed also, to house a flexible cable 26 which passes from the box $a$ through the swivel head $d$ within one of the tubular members 6 of the arm $b$ and thence through the swivel head $e$ and within the tubular member 22 of the arm $c$ to a lamp mounted at the end of this arm by means of any suitable type of universal joint.

The swivel heads are identical in design and only the upper one will be described here in detail. It is constituted by the central disc 9, provided with an annular cage 27 constituted by a circular flange or ring provided on the disc member 9 slotted at intervals along its circumference.

The spring 11 is disposed within this cage, being anchored at the inner end round the square boss 13 of the disc member 8, and at the outer end into one of the slots 27' of the ring 27.

The three disc members 8, 8' and 9 of the swivel head are held together by the screw 15 adapted to pass with an easy fit through a hole bored in the boss 13' on the disc member 8', and a hole bored in the boss 20 of the disc member 9 and screwing into a threaded bore 16 in the boss 13 of the member 8, a spring washer 28 being disposed between the disc members 8' and 9 to enable the pressure between these two disc members to be adjusted.

The ring 27 on the disc 2 butts against a steel washer 28, thereby providing frictional resistance to rotation adjustable by tightening the screw 15.

The tubes 6 and 22 constituting the arms b and c, respectively, are welded over holes provided in the flanges of the disc members 7' and 8', through which the cable passes into the tubes. Holes may be provided in the flanges of the disc members 7 and 8, to give access in washing the welding flux away.

The provision of a plurality of slots on the ring member 27 enables the position of the end of the spring 11 with respect to this member to be varied, and, with it, the rest position of the apparatus. A short length of tube 23 is provided in the direction diametrally opposite to that of the arm 22, to give the apparatus a balanced appearance.

In operation, when the jointed arms are displaced from the rest position, the springs are strained one way or the other, and the tangential force so produced increases with the amount of the angular displacement, providing a balancing force acting in the opposite direction, and approximately proportional, to the out-of-balance force caused by the weight of the lamp, the friction between the members of the joint assisting in securing a perfect balance in any position of the apparatus.

The jointed arms may be constituted by one, two or more tubes or rods, as may be desired. The swivel heads may be constituted by two relatively angularly movable members only, controlled by a spring in a manner similar to that described above.

The electric cable 26 is led from the lamp inside the tubular arms, the middle member of each joint being recessed to house a couple of turns of the cable, so as to allow the arms to move with absolute freedom. The aperture through which the cable passes is provided with fibre washers to prevent it from being frayed and to insulate it should it become so after a very long use. At the base, it passes on to a switch 24 fixed on the cover 5 and revolving with it, so that the cable cannot become twisted, the base piece 1 being provided with a circular groove 25 to allow the switch to occupy any position in azimuth.

The parts are made of any suitable material, preferably of a light alloy. The joint members may be made of some suitable synthetic resin, for example of the substance known under the trade-mark "Bakelite."

It is to be understood that my invention is not limited to the details of the foregoing disclosure but should be accorded the full scope of the following claims.

What I claim is:

1. A self-balancing support for a light article such as an electric lamp, comprising a base, a disc shaped joint member secured on a cover rotatably mounted on said base, a first arm member constituted by two parallel tubular members, each with a disc shaped joint member at each end, and a second arm member constituted by a tubular member with a disc shaped joint member at one end and, at the other end, a universal joint to which may be attached a light article such as an electric lamp, the disc shaped joint member on the cover and at one end of the second arm member being between the two disc shaped joint members at the ends of the tubular member of the first arm member, and means for maintaining the disc members in their mutual relationship until forcibly caused to rotate with respect to each other as may be desired, and adjusting the relative pressure between them.

2. A self-balancing support for a light article such as an electric lamp, comprising, a base, a recessed disc shaped joint member secured on a cover rotatably mounted on said base, a first arm member constituted by two parallel tubular members, each with a recessed disc shaped joint member at each end, and a second arm member constituted by a tubular member with a recessed disc shaped joint member at one end and, at the other end, a universal joint to which may be attached a light article such as an electric lamp, the disc shaped joint member on the cover and at one end of the second arm member being between the two disc shaped joint members at the ends of the tubular members of the first arm member, a resilient member in the space formed by the recessed discs of each joint, adapted to exert a tangential force between the relatively rotatable disc members of the joint, and a screw disposed transversely of the said disc members, passing centrally of said disc members, and adapted to adjust the relative pressure between the said three disc members.

3. A self-balancing support for a light article such as an electric lamp as claimed in claim 2, in which the element exerting the tangential force between the relatively rotating joint members is a spiral spring, one of the joint members being provided with a flange ring slotted peripherally to accommodate said spring, said spring being anchored at one end in one of the slots of said ring and at the other end on a square boss provided on another joint member.

4. A self-balancing support for a light article such as an electric lamp as claimed in claim 2, in which the element exerting the tangential force between the relatively rotating joint members is a spiral spring, one of the joint members being provided with a flange ring slotted peripherally to accommodate said spring, said spring being anchored at one end in one of the slots of said ring and at the other end on a square boss provided on another joint member and a steel spring washer on the latter joint member against which bears the edge of the flange ring, and means for varying the mutual pressure between the two joint members, thereby adjusting the frictional resistance of the two members to mutual rotation.

5. A self balancing support for an electric lamp as claimed in claim 2 comprising a cable for supplying current to the lamp said cable being led into a switch mounted on the cover of the base, and thence through the joints and within the arm members to the lamp mounted to the free end of the arm member further from the base.

6. A self balancing support for an electric lamp as claimed in claim 2 comprising a cable for supplying current to the lamp said cable being led into a switch mounted on the cover of the base, and thence through the joints and within the arm members to the lamp mounted to the free end of the arm member further from the base, the switch being mounted underneath the said cover and an annular recess in the base permitting the cover and switch to revolve about a vertical axis.

WILLIAM COURTNEY TRYTHALL.